(12) United States Patent
Hu et al.

(10) Patent No.: US 12,512,154 B2
(45) Date of Patent: Dec. 30, 2025

(54) ANALOG IN-MEMORY DISCRETE SIGNAL PROCESSOR WITH MINIMUM USAGE OF ADC

(71) Applicant: TetraMem Inc., Fremont, CA (US)

(72) Inventors: Miao Hu, San Jose, CA (US); Qiang Wei, San Ramon, CA (US)

(73) Assignee: TetraMem Inc., San Jose, CA (US)

( * ) Notice: Subject to any disclaimer, the term of this patent is extended or adjusted under 35 U.S.C. 154(b) by 64 days.

(21) Appl. No.: 18/332,572

(22) Filed: Jun. 9, 2023

(65) Prior Publication Data

US 2024/0412783 A1    Dec. 12, 2024

(51) Int. Cl.
| | | |
|---|---|---|
| *G11C 13/00* | (2006.01) | |
| *G06N 3/04* | (2023.01) | |
| *H03H 17/02* | (2006.01) | |
| *H03M 1/12* | (2006.01) | |

(52) U.S. Cl.
CPC ............ *G11C 13/003* (2013.01); *G06N 3/04* (2013.01); *G11C 2213/79* (2013.01); *H03H 17/02* (2013.01); *H03M 1/12* (2013.01)

(58) Field of Classification Search
CPC .... G11C 13/003; G11C 2213/79; G06N 3/04; G06N 3/045; G06N 3/065; H03H 17/02; H03M 1/12
USPC .......................................... 265/148; 365/148
See application file for complete search history.

(56) References Cited

U.S. PATENT DOCUMENTS

| | | | | |
|---|---|---|---|---|
| 5,745,409 | A * | 4/1998 | Wong .................. | G11C 27/005 |
| | | | | 365/45 |
| 10,050,679 | B2 * | 8/2018 | Rivière ................. | H04B 1/406 |
| 10,840,917 | B1 * | 11/2020 | Cali ....................... | H03L 7/093 |
| 2009/0168848 | A1 * | 7/2009 | Constantinidis ....... | H04B 1/707 |
| | | | | 375/140 |
| 2009/0168849 | A1 * | 7/2009 | Rouxel ................. | H04B 1/707 |
| | | | | 375/140 |
| 2009/0195426 | A1 * | 8/2009 | Ballantyne ............ | H03M 3/50 |
| | | | | 341/144 |
| 2010/0199237 | A1 * | 8/2010 | Kim ...................... | G06F 30/367 |
| | | | | 716/113 |
| 2014/0203875 | A1 * | 7/2014 | Zanchi ................... | H03F 3/005 |
| | | | | 330/260 |
| 2018/0364785 | A1 * | 12/2018 | Hu ...................... | G11C 13/0007 |
| 2022/0363405 | A1 * | 11/2022 | Auerbach ................ | B64F 5/60 |
| 2024/0427098 | A1 * | 12/2024 | Jaiswal ............. | G02B 6/29301 |

* cited by examiner

*Primary Examiner* — Michael T Tran
(74) *Attorney, Agent, or Firm* — Jaffery Watson Hamilton & DeSanctis LLP

(57) ABSTRACT

The present disclosure provides for a semiconductor device with integrated sensing and processing functionalities. The semiconductor device includes a sensing module configured to generate a plurality of analog sensing signals; and a machine learning (ML) processor. The sensing module and the ML processor are fabricated on a single wafer. The ML processor includes crossbar arrays that processes the analog sensing signals to generate analog preprocessed sensing data; an analog-to-digital converter (ADC) to convert the analog preprocessed sensing data into digital preprocessed sensing data; and a machine learning processing unit to process the digital preprocessed sensing data utilizing one or more machine learning model.

17 Claims, 9 Drawing Sheets

ANALOG IN-MEMORY DISCRETE SIGNAL PROCESSOR WITH MINIMUM USAGE OF ADC

TECHNICAL FIELD

Implementations of the disclosure relate generally to semiconductor-based computing devices and, more specifically, to analog in-memory discrete signal analyzers and/or processors which require minimal usage of analog-to-digital converters (ADCs) for low latency and high energy efficiency application. The invention is exemplified by audio applications but should not be limited to audio applications only. The discrete signal processor can process all kind of analog signals, Such as lidar signal, ultrasound signal and so on.

BACKGROUND

Speech processing and analysis involves analyzing large amounts of speech input signals collected by one or more input device such as, e.g., one or more microphones on an electronic device. Conventional speech processing based on digital signal processing places computational and power consumption burdens on most edge devices (e.g., local devices close to the sensors gathering the speech data), and may contribute to significant latency issues for the edge device(s). Accordingly, techniques to perform speech processing and analysis in an efficient manner may find utility, e.g., in enhancing the performance of electronic devices, particularly, edge devices.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to one or more aspects of the present disclosure, a semiconductor device that may function as an integrated sensing and machine learning processing device is provided. The semiconductor device may include.

In some embodiments, a semiconductor device comprises at least one input node to receive an input electrical signal representative of an analog input signal and an analog signal processor, comprising one or more crossbar arrays configured to implement one or more circuits to process the input electrical signal representative of an analog input signal to generate processed analog signal data.

In some embodiments, the semiconductor device comprises a sample and hold (S/H) circuit to sample and hold a plurality of input signal values at varying points in time to convert the original analog electrical signal to time discrete analog signal (In the latter part, it will be simply call it a discrete analog signal).

In some embodiments, the plurality of input signal values is provided as inputs to one or more crossbar arrays configured to implement at least one of a finite impulse response (FIR) filter to process the vectors of discrete analog signal in the time domain, a discrete Fourier transform (DFT) or a discrete wavelet transform (DWT) to map vectors of discrete analog signal to different dimensions space (such as frequency domain or combination of time/frequency domain) representative of the plurality of input signal values.

In some embodiments, the original, processed or mapped discrete analog signals are provide as an input to one or more crossbar arrays configured to implement at least one of a principal component analysis (PCA) and independent component analysis (ICA) circuit to perform blind source separation (BSS).

In some embodiments, an output of the one or more crossbar arrays configured to implement at least one of a principal component analysis (PCA) and independent component analysis (ICA) circuit to perform blind source separation (BSS) is provided as an input to one or more crossbar arrays configured to implement at least one of a deep neural network (DNN), a convolutional neural network (CNN), or a recurrent neural network (RNN).

In some embodiments, the electrical signal in the frequency domain is provide as an input to one or more crossbar arrays configured to implement a spectrum analyzer and noise suppressing circuit.

In some embodiments, an output of the spectrum analyzer and noise suppressing circuit is provided as an input to one or more crossbar arrays configured to implement an inverse discrete Fourier transform (IDFT) circuit.

In some embodiments, an output of the one or more crossbar arrays configured to implement inverse discrete Fourier transform (IDFT) circuit is provided as an input to one or more crossbar arrays configured to implement at least one of a deep neural network (DNN), a convolutional neural network (CNN), or a recurrent neural network (RNN).

In some embodiments, the electrical signal in the either time or frequency domain is provided as an input to one or more crossbar arrays configured to implement at least one of a compressed sensing (CS) circuit, a sparse coding (SC) circuit, or a filter bank (Fbank) circuit.

In some embodiments, an output of the one or more crossbar arrays configured to implement at least one a filter bank (Fbank) circuit is provided as an input to one or more crossbar arrays configured to implement a discrete cosine transform (DCT) circuit for the feature extraction.

In some embodiments, an output of the one or more crossbar arrays configured to implement at least one of a compressed sensing (CS) circuit, a sparse coding (SC) circuit, or a filter bank (Fbank) circuit is provided as an input to one or more crossbar arrays configured to implement at least one of a deep neural network (DNN), a convolutional neural network (CNN), or a recurrent neural network (RNN).

In some embodiments, the device further comprises at least one analog-to-digital converter communicatively coupled to the analog signal processor.

According to one or more aspects of the present disclosure, a method comprises receiving, in at least one input node, an input electrical signal representative of an analog input signal; and processing, in an analog signal processor comprising one or more crossbar arrays configured to implement one or more circuits, the input electrical signal representative of an analog input signal to generate processed analog signal data.

In some embodiments, the method comprises sampling and holding, in a sample and hold (S/H) circuit, a plurality of input signal values at varying points in time.

In some embodiments, the plurality of input signal values is provided as inputs to one or more crossbar arrays configured to implement at least one of a finite impulse response (FIR) filter, a discrete Fourier transform (DFT) filter, or a discrete wavelet transform (DWT) filter to generate an electrical signal in the frequency domain representative of the plurality of input signal values.

In some embodiments, the electrical signal in the frequency domain is provide as an input to one or more crossbar arrays configured to implement at least one of a principal component analysis (PCA) and independent component analysis (ICA) circuit to perform blind source separation (BSS).

In some embodiments, an output of the one or more crossbar arrays configured to implement at least one of a principal component analysis (PCA) and independent component analysis (ICA) circuit to perform blind source separation (BSS) is provided as an input to one or more crossbar arrays configured to implement at least one of a deep neural network (DNN), a convolutional neural network (CNN), or a recurrent neural network (RNN).

In some embodiments, the electrical signal in the frequency domain is provide as an input to one or more crossbar arrays configured to implement a spectrum analyzer and noise suppressing circuit.

In some embodiments, a semiconductor device comprises one or more audio input devices to generate an input electrical signal representative of an analog audio signal, at least one input node to receive the input electrical signal representative of an analog input signal, and an analog signal processor, comprising one or more crossbar arrays configured to implement one or more circuits to process the input electrical signal representative of an analog input signal to generate processed analog signal data.

In some embodiments, the semiconductor device comprises at least one analog-to-digital converter communicatively coupled to the analog signal processor.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding.

DETAILED DESCRIPTION

Aspects of the disclosure provide processing devices with analog signal processing such as, for example, audio signal processing, and with in-memory analyzers for implementing various discrete signal processing operations.

Figure 1:
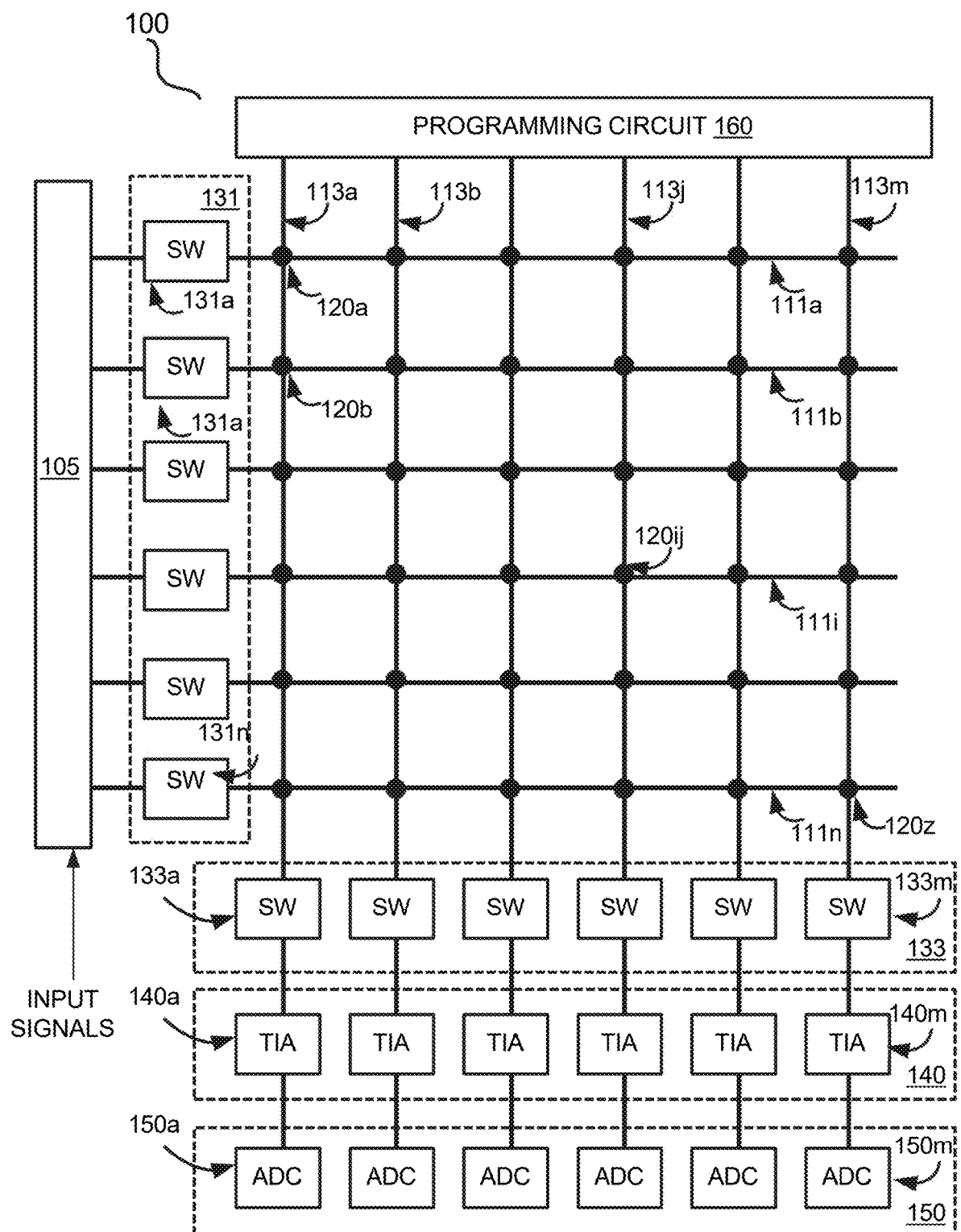
FIG. 1 is a schematic diagram illustrating an example of a crossbar array in accordance with some embodiments of the present disclosure.

FIG. 1 is a schematic diagram illustrating an example of a cross-point array 100 in accordance with some embodiments of the present disclosure. As shown, crossbar array 100 may include a plurality of interconnecting electrically conductive wires, such as one or more row wires 111$a$, 111$b$, . . . , 111$i$, . . . , 111$n$, and column wires 113$a$, 113$b$, . . . , 113$j$, . . . , 113$m$ for an n-row by m-column crossbar array. The crossbar array 100 may further include cross-point devices 120$a$, 120$b$, . . . , 120$z$, etc. Each of the cross-point devices may connect a row wire and a column wire. For example, the cross-point device 120$ij$ may connect the row wire 111$i$ and the column wire 113$j$. The number of the column wires 113$a$-$m$ and the number of the row wires 111$a$-$n$ may or may not be the same. Crossbar array 100 may further include a word line (WL) logic 105 that is connected to the cross-point devices via the row wires 111. The WL logic 105 may include any suitable component for applying input signals to selected cross-point devices via row wires 111, such as one or more digital-to-analog converters (DACs), amplifiers, etc. Each of the input signals may be a voltage signal, a current signal, etc. The input signals may correspond to the analog sensing signals produced by sensing module 110 of FIGS. 1A-1B.

Row wires 111 may include a first row wire 111$a$, a second row wire 111$b$, . . . , 111$i$, . . . , and a n-th row wire 111$n$. Each of row wires 111$a$, . . . , 111$n$ may be and/or include any suitable electrically conductive material. In some embodiments, each row wire 111$a$-$n$ may be a metal wire.

Column wires 113 may include a first column wire 113$a$, a second column wire 113$b$, . . . , and an m-th column wire 113$m$. Each of column wires 113$a$-$m$ may be and/or include any suitable electrically conductive material. In some embodiments, each column wire 113$a$-$m$ may be a metal wire.

Each cross-point device 120 may be and/or include any suitable device with tunable resistance, such as a memristor, phase-change memory (PCM) devices, floating gates, spintronic devices, ferroelectric devices, RRAM devices, etc.

Each of row wires 111$a$-$n$ may be connected to one or more row switches 131 (e.g., row switches 131$a$-$n$). Each row switches 131 may include any suitable circuit structure that may control current flowing through row wires 111$a$-$n$. For example, row switches 131 may be and/or include a CMOS switch circuit.

Each of column wires 113$a$-$m$ may be connected to one or more column switches 133 (e.g., switches 133$a$-$m$). Each column switches 133$a$-$m$ may include any suitable circuit structure that may control current passed through column wires 113$a$-$m$. For example, column switches 133$a$-$m$ may be and/or include a CMOS switch circuit. In some embodiments, one or more of switches 131$a$-$n$ and 133$a$-$m$ may further provide fault protection, electrostatic discharge (ESD) protection, noise reduction, and/or any other suitable function for one or more portions of crossbar array 100.

Output sensor(s) 140 may include any suitable component for converting the current flowing through column wires 113a-n into the output signal, such as one or more transimpedance amplifier(s) (TIAs) 140a-n. Each of the TIAs 140a-n may convert the current through a respective column wire into a respective voltage signal. Each ADCs 150a-n may convert the voltage signal produced by its corresponding TIA into a digital output. In some embodiments, output sensor(s) 140 may further include one or more multiplexers (not shown). In some embodiments, output sensors can be simplified to directly buffer and pass analog output to the next crossbar without analog-to-digital conversion.

The programming circuit 160 may program the cross-point devices 120 selected by switches 131 and/or 133 to suitable conductance values. For example, programming a cross-point device may involve applying a suitable voltage signal or current signal across the cross-point device. The resistance of each cross-point device may be electrically switched between a high-resistance state and a low-resistance state. Setting a cross-point device may involve switching the resistance of the cross-point from the high-resistance state to the low-resistance state. Resetting the cross-point device may involve switching the resistance of the cross-point from the low-resistance state to the high-resistance state.

Crossbar array 100 may perform parallel weighted voltage multiplication and current summation. For example, an input voltage signal may be applied to one or more rows of crossbar array 100 (e.g., one or more selected rows). The input signal may flow through the cross-point devices of the rows of the crossbar array 100. The conductance of the cross-point device may be tuned to a specific value (also referred to as a "weight"). By Ohm's law, the input voltage multiplies the cross-point conductance and generates a current from the cross-point device. By Kirchhoff's law, the summation of the current passing the devices on each column generates the current as the output signal, which may be read from the columns (e.g., outputs of the ADCs). According to Ohm's law and Kirchhoff's current law, the input-output relationship of the crossbar array can be represented as I=VG, wherein I represents the output signal matrix as current; V represents the input signal matrix as voltage; and G represents the conductance matrix of the cross-point devices. As such, the input signal is weighted at each of the cross-point devices by its conductance according to Ohm's law. The weighted current is outputted via each column wire and may be accumulated according to Kirchhoff's current law. This may enable in-memory computing (IMC) via parallel multiplications and summations performed in the crossbar arrays.

Crossbar array 100 may be configured to perform vector-matrix multiplication (VMM). A VMM operation may be represented as Y=XA, wherein each of Y, X, A represents a respective matrix. More particularly, for example, input vector X may be mapped to the input voltage V of crossbar array 100. Matrix A may be mapped to conductance values G. The output current I may be read and mapped back to output results Y. In some embodiments, crossbar array 100 may be configured to implement a portion of a neural network by performing VMMs.

In some embodiments, crossbar array 100 may perform convolution operations. For example, performing 1D convolution on input data may involve applying a single convolution kernel to the input signals. Performing a depth-wise convolution on the input data may involve convolving each channel of the input data with a respective kernel corresponding to the channel and stacking the convolved outputs together. The convolution kernel may have a particular size defined by multiple dimensions (e.g., a width, a height, a channel, etc.). The convolution kernel may be applied to a portion of the input data having the same size to produce an output. The output may be mapped to an element of the convolution result that is located at a position corresponding to the position of the portion of the input data.

The programming circuit 160 may program the crossbar array 100 to store convolution kernels for performing 1D convolution operations. For example, a convolution kernel may be converted into a vector and mapped to a plurality of cross-point devices of the crossbar array that are connected to a given bit line. In particular, the conductance values of the cross-point devices may be programmed to values representative of the convolution kernel. In response to the input signals, the crossbar array 100 may output, via the given bit line, a current signal representative of a convolution of the input signals and the 2D convolution kernel. In some embodiments, crossbar array 100 may store multiple 2D convolution kernels by mapping each of the 2D convolution kernels to the cross-point devices connected to a respective bit line. Crossbar array 100 may output a plurality of output signals (e.g., current signals) representative of the convolution results via column wires 113.

Figure 2:
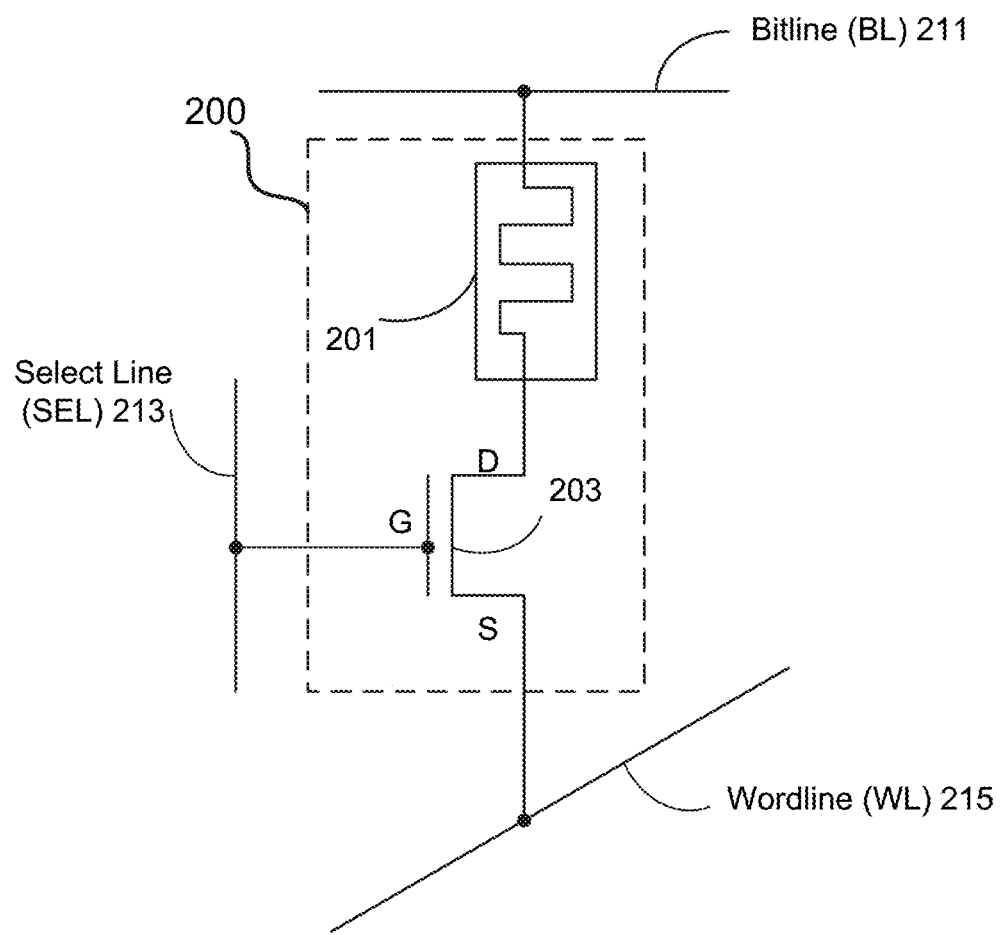
FIG. 2 is a diagram illustrating an example of a crossbar device in accordance with some embodiments of the present disclosure.

FIG. 2 is a schematic diagram illustrating an example of a cross-point device in accordance with some embodiments of the present disclosure. As shown, cross-point device 200 may connect a bitline (BL) 211, a select line (SEL) 213, and a wordline (WL) 215. The bitline 211 and the wordline 215 may be a column wire and a row wire as described in connection with FIG. 1, respectively.

Cross-point device 200 may include an RRAM device 201 and a transistor 203. A transistor is a three-terminal device, which may be marked as gate (G), source (S), and drain (D), respectively. The transistor 203 may be serially connected to RRAM device 201. As shown in FIG. 2, the first electrode of the RRAM device 201 may be connected to the drain of transistor 203. The second electrode of the RRAM device 201 may be connected to the bit line 211. The source of the transistor 203 may be connected to the word line 215. The gate of the transistor 203 may be connected to the select line 213. Cross-point device 200 may also be referred to as in a 1-transistor-1-resistor (1T1R) configuration. The transistor 203 may perform as a selector as well as a current controller, which may set the current compliance to the RRAM device 201 during programming. The gate voltage on transistor 203 can set current compliances to cross-point device 200 during programming and can thus control the conductance and analog behavior of cross-point device 200. For example, when cross-point device 200 is set from a high-resistance state to a low-resistance state, a set signal (e.g., a voltage signal, a current signal) may be provided via the bit line (BL) 211. Another voltage, also referred as a select voltage or gate voltage, may be applied via the select line (SEL) 213 to the transistor gate to open the gate and set the current compliance, while the word line (WL) 215 may be set to ground. When cross-point device 200 is reset from the low-resistance state to the high-resistance state, a gate voltage may be applied to the gate of the transistor 203 via the select line 213 to open the transistor gate. Meanwhile, a reset signal may be sent to the RRAM device 201 via the word line 215, while the bit line 211 may be set to ground.

Figure 3:
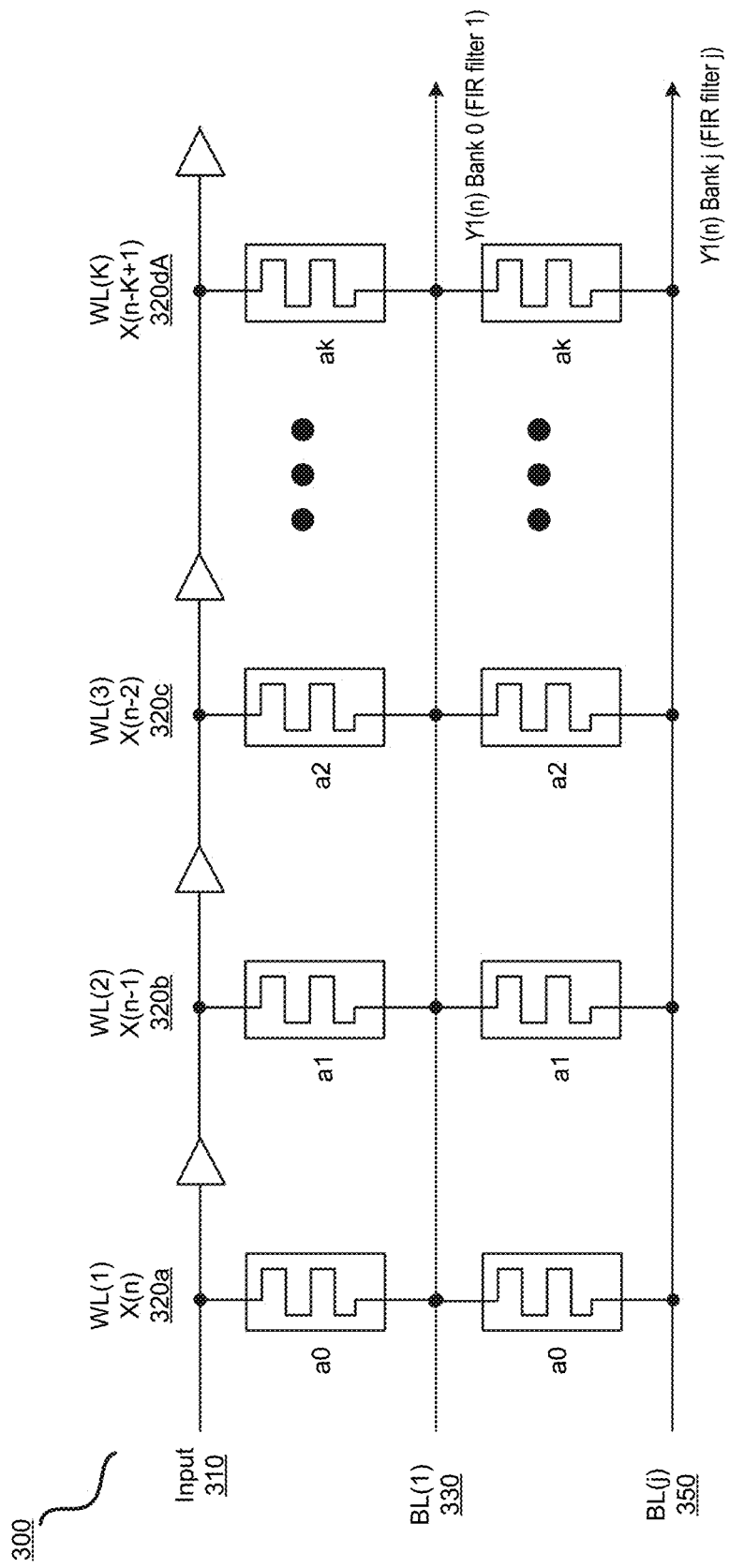
FIG. 3 is a schematic diagram illustrating an example finite impulse response (FIR) filter in accordance with some embodiments of the present disclosure.

FIG. 3 is a schematic diagram illustrating an example finite impulse response (FIR) filter 300 in accordance with some embodiments of the present disclosure. Referring to FIG. 3, in some examples FIR filter 300 may be implemented using crossbar devices and comprises an input line 310 to receive an input, a first bitline BL(1) 330, and at least one addition bitline BL(j) 350. FIR filter 300 further comprises a series of wordlines WL(1) 320*a*, WL(2) 320*b*, WL(3) 320(*c*) through WL(k) 320*k*, which may be described collectively herein by reference numeral 320. An array of RRAM devices, such as the RRAM device 201 depicted in FIG. 2, are connected between the bitlines and the wordlines as illustrated in FIG. 4.

Figure 4:
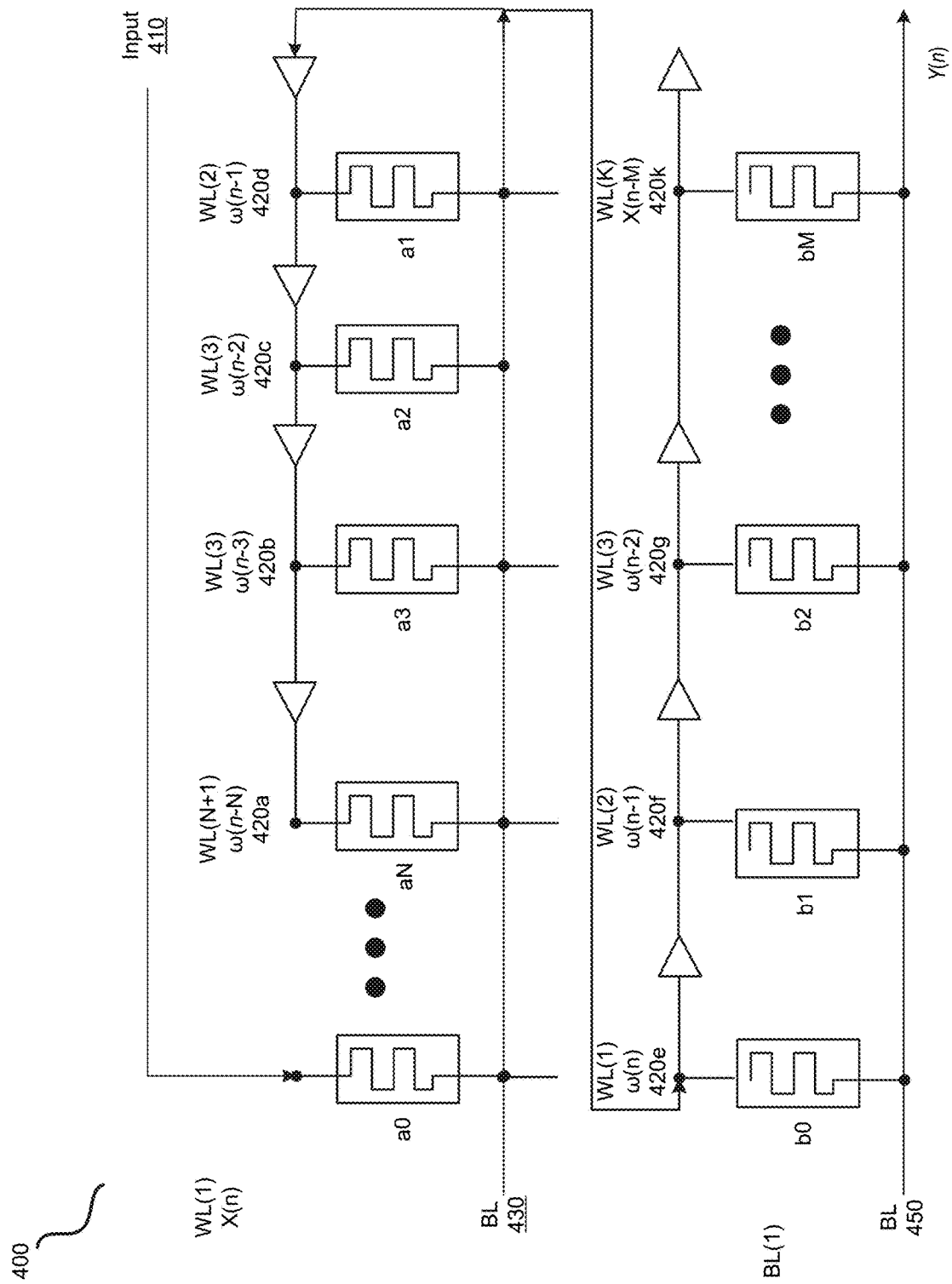
FIG. 4 is a schematic diagram illustrating an example infinite impulse response (IIR) filter in accordance with some embodiments of the present disclosure.

FIG. 4 is a schematic diagram illustrating an example infinite impulse response (IIR) filter 400 in accordance with some embodiments of the present disclosure. Referring to FIG. 4, in some examples IIR filter 400 may be implemented using crossbar devices and comprises an input line 410 to receive an input, a first bitline BL(1) 410, and at least one addition bitline BL(j) 450. IIR filter 400 further comprises a series of wordlines WL(1) 420*a*, WL(2) 420*b*, WL(3) 420*c* through WL(k) 420*k*, which may be described collectively herein by reference numeral 420. An array of RRAM devices, such as the RRAM device 201 depicted in FIG. 2, are connected between the bitlines and the wordlines as illustrated in FIG. 4.

Figure 5:
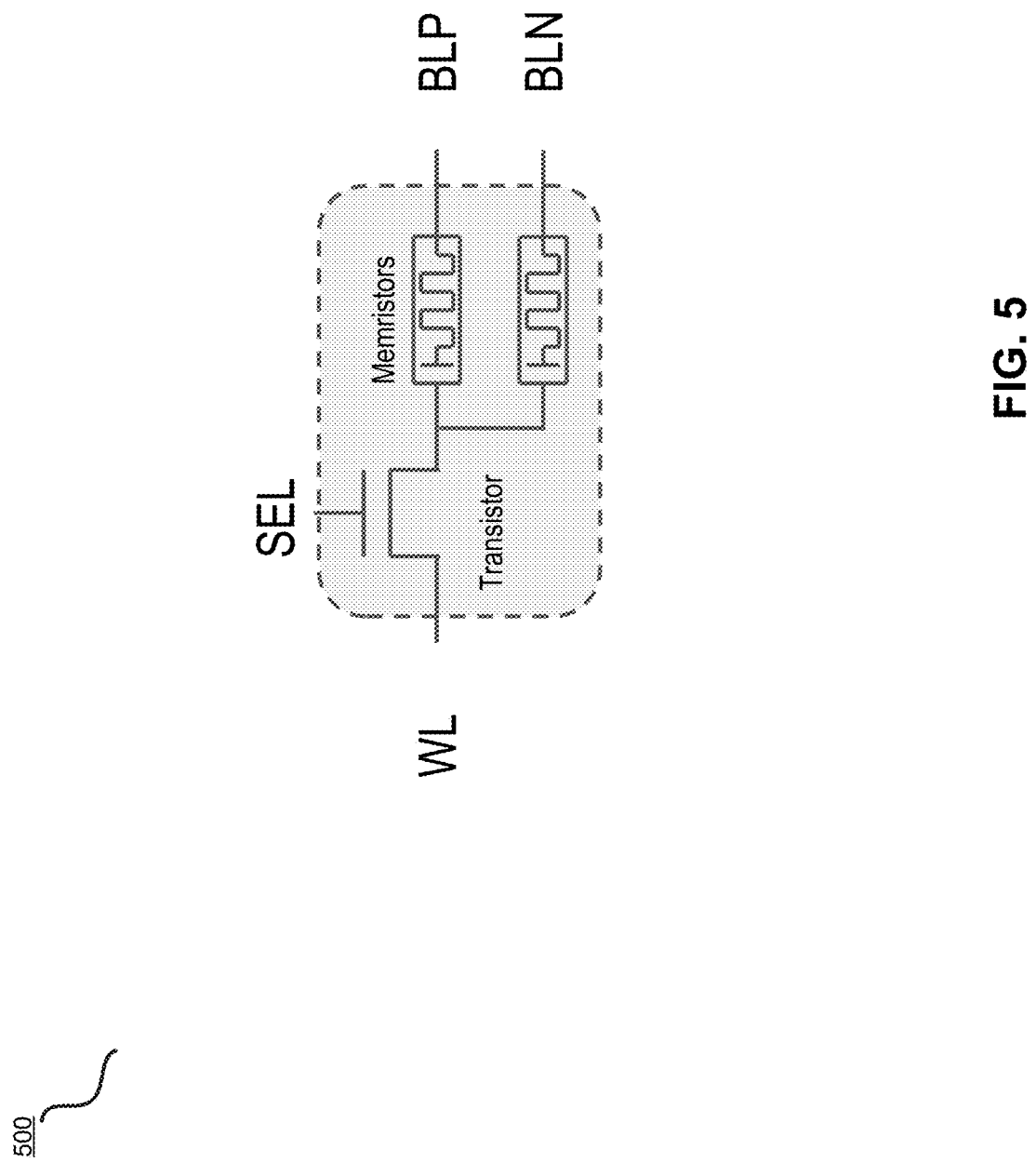
FIG. 5 is a schematic diagram illustrating a one transistor two resistor crossbar cell, in accordance with some embodiments of the present disclosure.

FIG. 5 is a schematic diagram illustrating a one transistor two resistor crossbar (1T2R) cell 500, in accordance with some embodiments of the present disclosure. Referring to FIG. 5, input voltage signal Vin will be passed to the wordline (WL), which is a linear mapping of input value x. The transistor is controlled by a select (SEL) signal to enable or disable the input voltage signal Vin from reaching the two memristor devices). For the two memristors, one that connected to bitline positive (BLP), named as Rp, is to store the positive weight, and the other that connected to bitline negative (BLN), named as Rn, is to store the negative weight. BLP and BLN are connected to virtual ground, so that when SEL is ON, the effective voltage across the 1T2R cell is Vin. To map a signed weight x to the 1T2R device, if the weight is positive, Rn will be RESET to have very low conductance Goff, Rp will be programmed to have conductance Gw+Goff, where Gw is a linear mapping of the signed weight w; if the weight is negative, Rp will be RESET to have very low conductance Goff, Rn will be programmed to have conductance Gw+Goff, where Gw is a linear mapping of the signed weight w. The currents from Rp and Rn will be subtracted to generate the final output current, so that the final output current I=Vin*Gw if w is positive, and I=−Vin*Gw if w is negative. In this way, an analog multiplication between input x and signed weight w is achieved.

Figure 6:
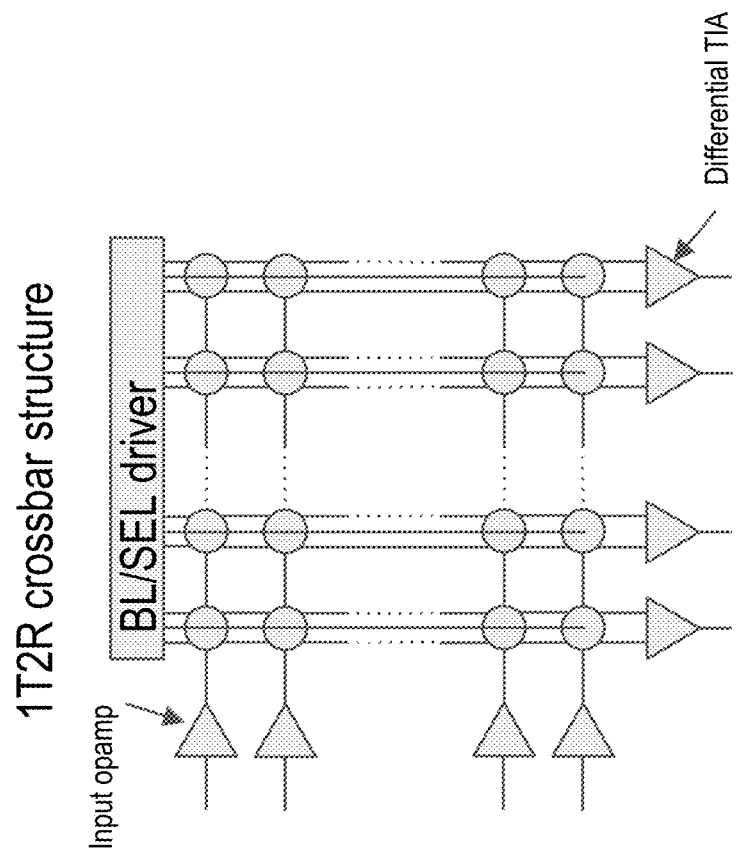
FIG. 6 is a schematic diagram illustrating a one transistor two resistor crossbar structure, in accordance with some embodiments of the present disclosure.

FIG. 6 is a schematic diagram illustrating a one transistor two resistor crossbar structure 600, in accordance with some embodiments of the present disclosure. Referring to FIG. 6, an array of 1T2R is formed, with 1T2R cells on the same row sharing the WL, and 1T2R cells on the same column sharing the BLP, BLN, and SEL. The input voltage signals are provided by a column of OpAmps, and the output current are subtracted and converted to voltage signal by a row of Trans-Impedance Amplifiers (TIA). The SEL controls and BL driver for programming are implemented in the BL/SEL driver circuit. Together, they provide a 1R2R crossbar structure that can implement multiplication of input vector to a weight matrix, where both input vector and weight matrix can be signed values.

Described herein are to implement analog in-memory discrete signal processor. In some examples, most of the computing circuitry can be implemented based on memristor x-bar devices. Some basic computing operations such as compare, add, subtract, log, square, and root can be implemented by either analog circuits or digital circuits. The usage of analog-to-digital converters (ADCs) circuit can be reduced to only those situations in which digital processing is necessary to reduce latency and power consumption significantly. The ADC(s) can be configurable to used by the output of each computing step performed by in-memory circuits. Further, design principles can take advantage of non-volatility of memristor circuits and power up the circuits only when the next step computing circuit when it is necessary. This method can achieve extreme low power (i.e., microwatt level) smart sensing always on feature.

In some applications, two transformation techniques for discrete analog signal without ADC may be implemented: Principal Component Analysis (PCA) and Independent Component Analysis (ICA). Both techniques attempt to find an independent set of vectors onto which the data can be transformed. The data that are projected (or mapped) onto each vector are the independent sources. The basic goal in PCA is to decorrelate the signal by projecting the data onto orthogonal axes. However, ICA results in a biorthogonal transform of the data and the axes are not necessarily orthogonal. Both PCA and ICA can be used to perform lossy or lossless transformations by multiplying the recorded (observation) data by a separation or de-mixing matrix. Lossless PCA and ICA both involve projecting the data onto a set of axes which are determined by the nature of the data and are therefore methods of blind source separation (BSS). These techniques are considered blind because the axes of projection and therefore the sources are determined through the application of an internal measure and without the use of any prior knowledge of the data structure.

Compressed sensing (also known as compressive sensing, compressive sampling, or sparse sampling) is a signal processing technique for efficiently acquiring and reconstructing a signal, by finding solutions to underdetermined linear systems. This is based on the principle that, through optimization, the sparsity of a signal can be exploited to recover it from far fewer samples than required by the Nyquist-Shannon sampling theorem. There are two conditions under which recovery is possible. The first one is sparsity, which requires the signal to be sparse in some domain. The second one is incoherence, which is applied through the isometric property, which is sufficient for sparse signals.

The whole compressed sensing is based on the sparsity of signals, but not all signals are naturally sparsity, such as sound. Is compressive sensing not applicable to signals that are not sparse? The answer is no, compressed sensing can still be used for signals that are not naturally sparse. The signal need be mapped to other Spaces. In other Spaces where the signal is sparse, compressed sensing can be directly used in the mapped space. This can be defined as follows:

$$s = \psi z, \text{ where } \psi \in \mathfrak{R}^{n \times K}, z \in \mathfrak{R}^{k \times 1}, s \in \mathfrak{R}^{n \times 1}$$

In this equation, the variable s represents the signal to be reconstructed (original signal); the variable $\psi$ represents the mapping matrix which transform the non-sparse signal into the sparse signals; In this sparse z, the non-zero elements are much less than zero element. Therefore, the original compressed sensing formula definition is also changed as follows:

$$y = Hs = H\psi z = \theta z, \text{ where } \theta \in \mathfrak{R}^{m \times K}$$

In this equation, the variable $\theta$ can be regarded as H in the original compressed sensing formula, and the compressing algorithm can be used in the same way. There are some choices for different signals can be used as ψ, such as Discrete Cosine transform (DCT), Discrete Wavelet Transform (DWT), And Dictionary Learning.

Compressed sensing or the Sparse Coding can be implemented based on analog in-memory discrete signal processor for analog signal without ADC.

Figure 7:
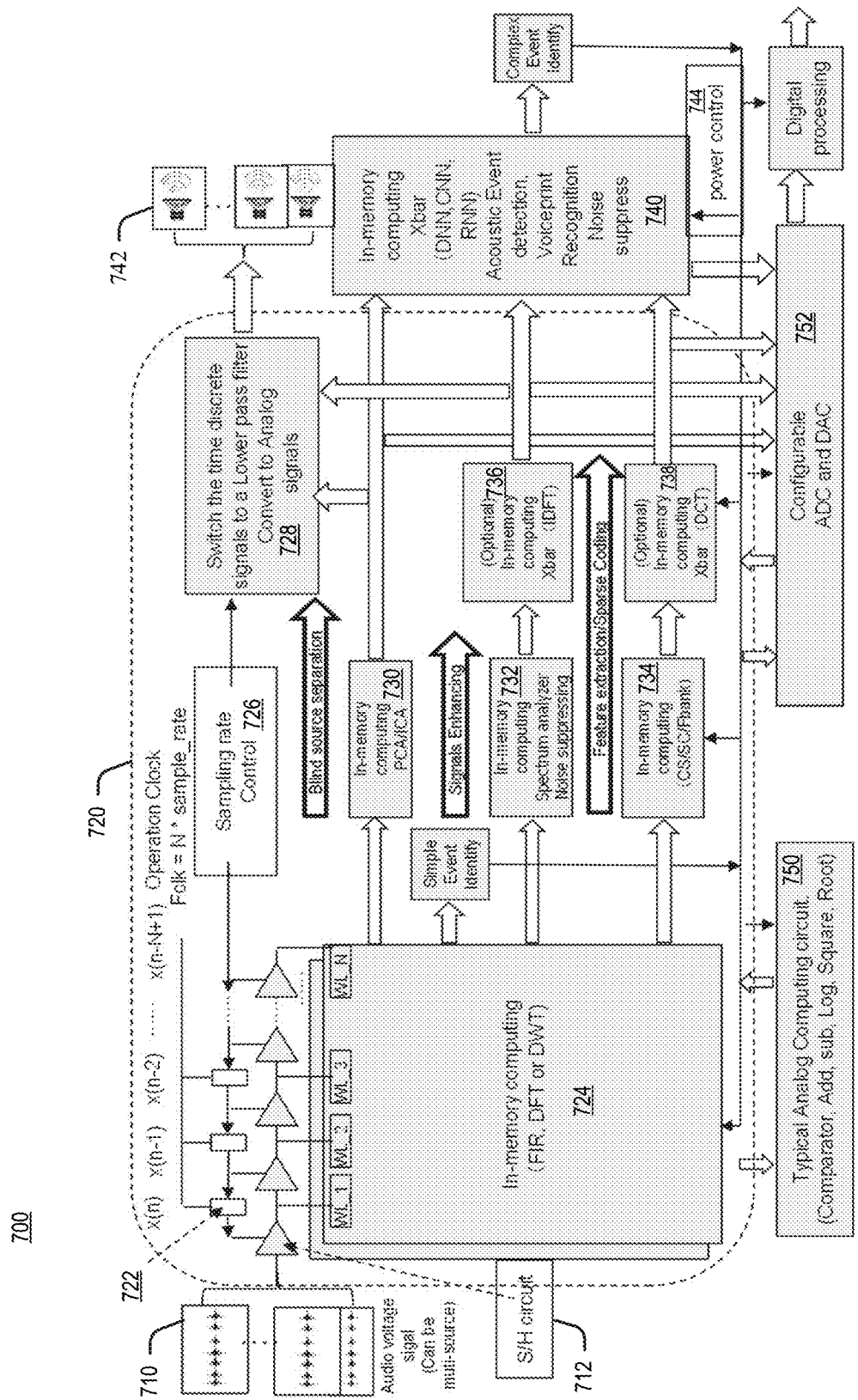
FIG. 7 is a schematic diagram illustrating components of a semiconductor device to implement analog in-memory time/frequency analyzers for audio applications, in accordance with some embodiments of the present disclosure.

FIG. 7 is a schematic diagram illustrating components of a semiconductor device to implement analog in-memory discrete signal processor for audio applications, in accordance with some embodiments of the present disclosure. Referring to FIG. 7, in some examples a semiconductor device comprises an input node to receive one or more input electrical signals 710 representative of an analog input signal such as a speech input. In some examples the input electrical signal may be an audio voltage signal generated by an input device such as one or microphone or the like. The semiconductor device further comprises an analog signal processor 720 comprising one or more crossbar arrays configured to implement one or more circuits to process the input electrical signal representative of an analog input signal to generate processed analog signal data.

More particularly, the input electrical signal(s) 710 may be input into a store and hold circuit 712, which sample the input electrical analog signal(s) 710 to discrete signal for the in-memory computing circuit 724. In some examples, the in-memory computing circuit comprises one or more finite impulse response (FIR) filters, discrete Fourier transform (DFT) circuits, or discrete wavelet transform (DWT) filters to generate an electrical signal in the time or frequency domain representative of the plurality of input signal values. A sampling rate control circuit 726 controls the sampling rate of the input electrical signals 710. The output of the sampling rate control circuit 726 is stored in a series of D-flip flops 722 communicatively coupled to the store and hold circuit 712. The sampling control circuit 726 controls a circuit 728 switch the time discrete signals to a lower-pass filter and convert the signals to an analog signal, which may be output on or more output devices such as microphone(s) 742.

The output of the in-memory computing circuit 724 is provided to an in-memory computing circuit 730 which comprises one or more crossbar arrays configured to implement at least one of a principal component analysis (PCA) and independent component analysis (ICA) circuit to perform blind source separation (BSS). The output of the in-memory computing circuit 730 is provided as an input an to one or more crossbar arrays 740 configured to implement at least one of a deep neural network (DNN), a convolutional neural network (CNN), or a recurrent neural network (RNN).

The output of the in-memory computing circuit 724 is provided as an electrical signal in the frequency domain as an input to an in-memory computing circuit 730 comprising one or more crossbar arrays configured to implement a spectrum analyzer and noise suppressing circuit to an in-memory computing circuit 732. The output of the computing circuit 732 is provided as an input to an in-memory computing circuit 736 comprising one or more crossbar arrays configured to implement an inverse discrete Fourier transform (IDFT) circuit. The output of the in-memory computing circuit 736 is provided as an input to one or more crossbar arrays 740 configured to implement at least one of a deep neural network (DNN), a convolutional neural network (CNN), or a recurrent neural network (RNN).

The output of the in-memory computing circuit 724 is provided as an electrical signal in the either time or frequency domain as an input to an in-memory computing circuit 734 comprising one or more crossbar arrays configured to implement at least one of a compressed sensing (CS) circuit, a sparse coding (SC) circuit, or a filter bank (Fbank) circuit. The output of the in-memory computing circuit 734 may optionally be provided as an input to an in-memory computing circuit 738 comprising one or more crossbar arrays configured to implement a discrete cosine transform (DCT) circuit. The output of the in-memory computing circuit 738 is provided as an input an to one or more crossbar arrays 740 configured to implement at least one of a deep neural network (DNN), a convolutional neural network (CNN), or a recurrent neural network (RNN).

One or more analog computing circuits to perform operations such as compare, add, subtracts, log, square, root, etc., may be communicatively coupled to the analog signal processor 720. Further, one or more configurable analog-to-digital converters and/or digital-to-analog converters 752 may be communicatively coupled to the analog signal processor 720. A power control circuit 744 may be connected to an external power supply (not shown) to control power supplies to the various circuits depicted in FIG. 7.

Figure 8:
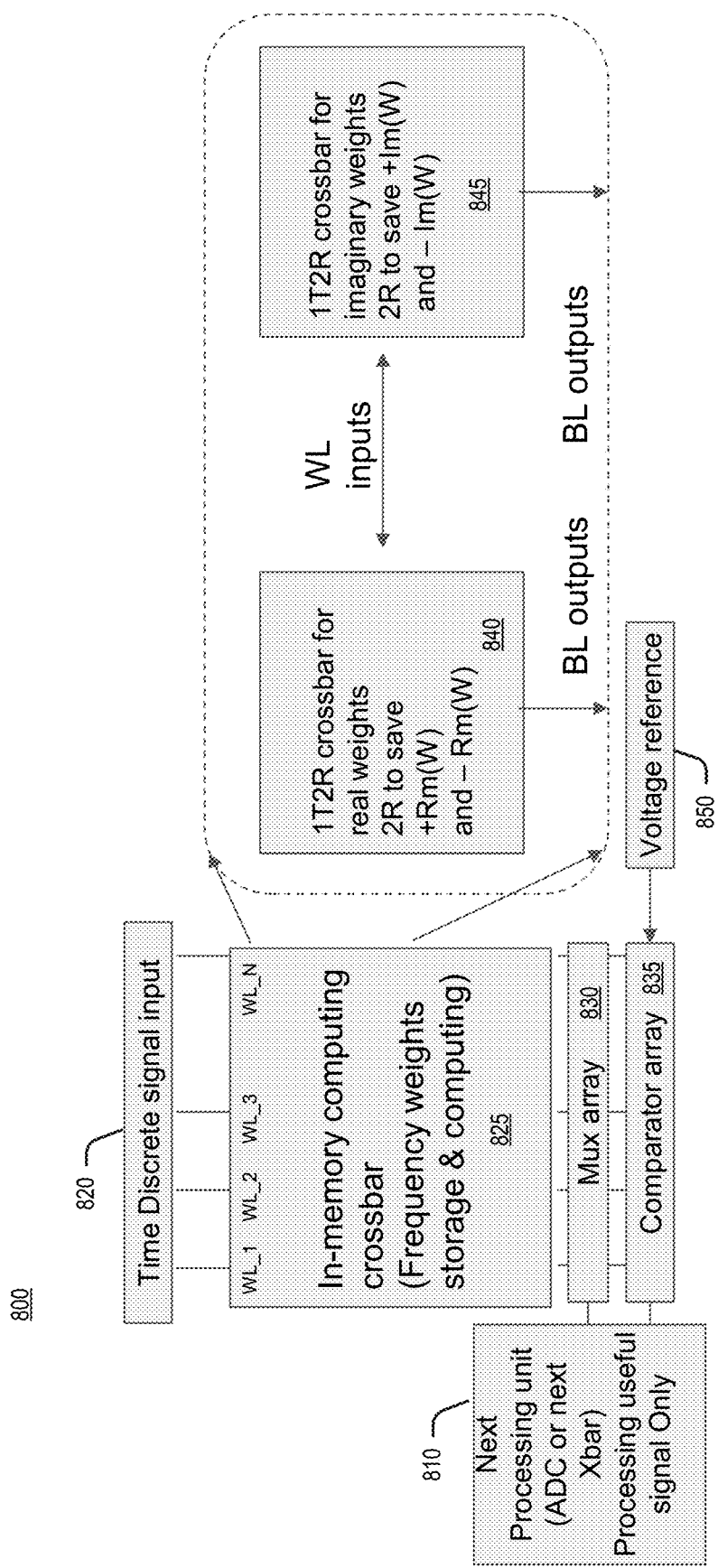
FIG. 8 is a schematic diagram illustrating components of a semiconductor device to implement a discrete Fourier transform, in accordance with some embodiments of the present disclosure.

FIG. 8 is a schematic diagram illustrating components of a semiconductor device 800 to implement a discrete Fourier transform, in accordance with some embodiments of the present disclosure. Referring to FIG. 8, in some examples semiconductor device 800 comprises a next processing unit circuit 810 which comprises at least one of an analog to digital converter (ADC) or a crossbar device. The output of the next processing unit circuit 810 is input to a multiplexer array 830 and to a comparator array 835, which is communicatively coupled to the multiplexer array 830. Comparator array receives an input from a voltage reference 850.

A time discrete signal input 820 is provided as an input to an in-memory computing crossbar device 825. In-memory crossbar device 825 which performs frequency weights storage and computing. The in-memory computing crossbar device 825 may comprise a 1T2R crossbar device 84 for real weights and a 1T2R crossbar device 855 for imaginary weights.

Figure 9:
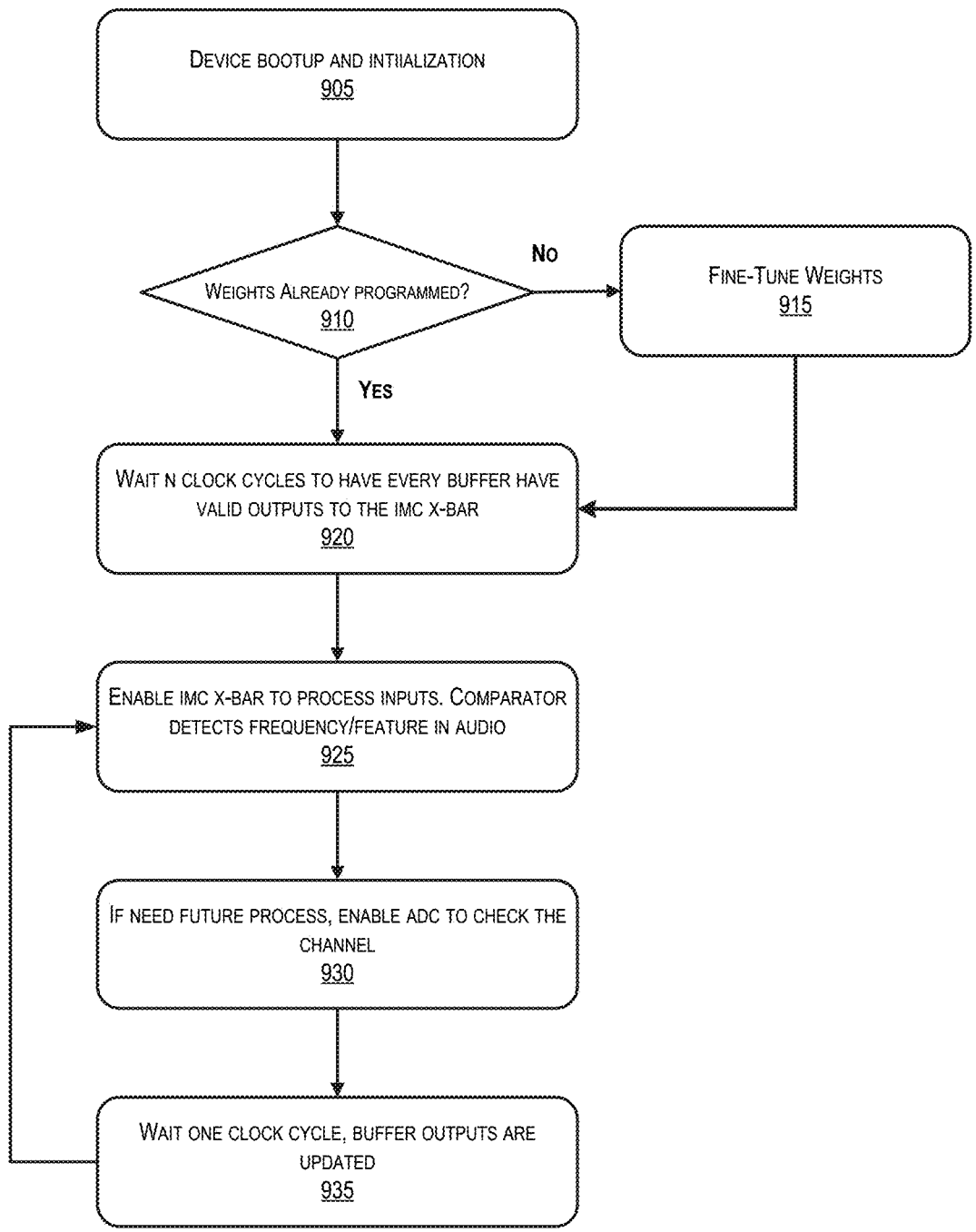
FIG. 9 is a flow diagram illustrating operations in a method to operate the semiconductor device depicted in FIG. 8, in accordance with some embodiments of the present disclosure.

FIG. 9 is a flow diagram illustrating operations in a method to operate the semiconductor device depicted in FIG. 8, in accordance with some embodiments of the present disclosure. Referring to FIG. 9, at operation 910 the semiconductor device is booted up and initialized. If, at operation 910, the weights are not already programmed, then operation 915 is implemented and the weights are fine-tuned. By contrast, if at operation 910 the weights are already programmed then operation 920 is implemented and the device waits for a number (N) clock cycles such that every buffer has valid outputs to the crossbar device 825.

At operation 925 the crossbar device 825 is enabled to process inputs. The comparator array 835 detects frequency and/or feature information in the audio inputs. If, at operation 930, processing is needed in the future, the analog-to-digital converter is enabled to check the channel. At operation 935, the device waits one clock cycle and the buffer outputs are updated. Operations 925 through 93 may be repeated.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

The terms "approximately," "about," and "substantially" as used herein may mean within a range of normal tolerance in the art, such as within 2 standard deviations of the mean, within ±20% of a target dimension in some embodiments, within ±10% of a target dimension in some embodiments, within ±5% of a target dimension in some embodiments, within ±2% of a target dimension in some embodiments, within ±1% of a target dimension in some embodiments, and yet within ±0.1% of a target dimension in some embodiments. The terms "approximately" and "about" may include the target dimension. Unless specifically stated or obvious from context, all numerical values described herein are modified by the term "about."

As used herein, a range includes all the values within the range. For example, a range of 1 to 10 may include any number, combination of numbers, sub-range from the numbers of 1, 2, 3, 4, 5, 6, 7, 8, 9, and 10 and fractions thereof.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

The terms "first," "second," "third," "fourth," etc. as used herein are meant as labels to distinguish among different elements and may not necessarily have an ordinal meaning according to their numerical designation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

As used herein, when an element or layer is referred to as being "on" another element or layer, the element or layer may be directly on the other element or layer, or intervening elements or layers may be present. In contrast, when an element or layer is referred to as being "directly on" another element or layer, there are no intervening elements or layers present.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A semiconductor device, comprising:
   at least one input node to receive an input electrical signal representative of an analog input signal;
   an analog signal processor, comprising:
   one or more crossbar arrays configured to implement one or more circuits to process the input electrical signal representative of an analog input signal to generate processed analog signal data; and
   a sample-and-hold (S/H) circuit to sample and hold a plurality of input signal values at varying points in time based on a configurable sampling rate, wherein the plurality of input signal values is provided as inputs to one or more crossbar arrays configured to implement at least one of a finite impulse response (FIR) filter, a discrete Fourier transform (DFT) filter, or a discrete wavelet transform (DWT) filter to generate an electrical signal in the time or frequency domain representative of the plurality of input signal values.

2. The semiconductor device of claim 1, wherein the electrical signal in the time or frequency domain is provided as an input to one or more crossbar arrays configured to implement at least one of a principal component analysis (PCA) and independent component analysis (ICA) circuit to perform blind source separation (BSS).

3. The semiconductor device of claim 2, wherein an output of the one or more crossbar arrays configured to implement at least one of a principal component analysis (PCA) and independent component analysis (ICA) circuit to perform blind source separation (BSS) is provided as an input to one or more crossbar arrays configured to implement at least one of a deep neural network (DNN), a convolutional neural network (CNN), or a recurrent neural network (RNN).

4. The semiconductor device of claim 1, wherein the electrical signal in the time or frequency domain is provided as an input to one or more crossbar arrays configured to implement a spectrum analyzer and noise suppressing circuit.

5. The semiconductor device of claim 4, wherein an output of the spectrum analyzer and noise suppressing circuit is provided as an input to one or more crossbar arrays configured to implement an inverse discrete Fourier transform (IDFT) circuit.

6. The semiconductor device of claim 5, wherein an output of the one or more crossbar arrays configured to implement the inverse discrete Fourier transform (IDFT) circuit is provided as an input to one or more crossbar arrays configured to implement at least one of a deep neural network (DNN), a convolutional neural network (CNN), or a recurrent neural network (RNN).

7. The semiconductor device of claim 1, wherein the input electrical signal, time domain signal (processed by FIR) or transformed signal by DCT or DWT is provided as an input to one or more crossbar arrays configured to implement at least one of a compressed sensing (CS) circuit, a sparse coding (SC) circuit.

8. The semiconductor device of claim 1, wherein the electrical signal in the frequency domain (Transformed by DFT) is provided as an input to one or more crossbar arrays configured to implement a Filter Bank (Fbank) circuit.

9. The semiconductor device of claim 8, wherein an output of the one or more crossbar arrays configured to implement at least one of a filter bank (Fbank) circuit is provided as an input to one or more crossbar arrays configured to implement a discrete cosine transform (DCT) circuit for feature extraction.

10. The semiconductor device of claim 7, wherein an output of the one or more crossbar arrays configured to implement at least one of a compressed sensing (CS) circuit, a sparse coding (SC) circuit, or a filter bank (Fbank) circuit is provided as an input to one or more crossbar arrays configured to implement at least one of a deep neural network (DNN), a convolutional neural network (CNN), or a recurrent neural network (RNN).

11. The semiconductor device of claim 1, further comprising at least one analog-to-digital converter communicatively coupled to the analog signal processor.

12. A method, comprising:
   receiving, in at least one input node, an input electrical signal representative of an analog input signal;
   processing, in an analog signal processor comprising one or more crossbar arrays configured to implement one or more circuits, the input electrical signal representative of an analog input signal to generate processed analog signal data; and
   sampling and holding, in a sample-and-hold (S/H) circuit, a plurality of input signal values at varying points in time based on a configurable sampling rate, wherein the plurality of input signal values is provided as inputs to one or more crossbar arrays configured to implement at least one of a finite impulse response (FIR) filter, a discrete Fourier transform (DFT) filter, or a discrete wavelet transform (DWT) filter to generate an electrical signal in the time or frequency domain representative of the plurality of input signal values.

13. The method of claim 4, wherein the electrical signal in the time or frequency domain is provided as an input to one or more crossbar arrays configured to implement at least one of a principal component analysis (PCA) and independent component analysis (ICA) circuit to perform blind source separation (BSS).

14. The method of claim 13, wherein an output of the one or more crossbar arrays configured to implement at least one of a principal component analysis (PCA) and independent component analysis (ICA) circuit to perform blind source separation (BSS) is provided as an input to one or more crossbar arrays configured to implement at least one of a deep neural network (DNN), a convolutional neural network (CNN), or a recurrent neural network (RNN).

15. The method of claim 12, wherein the electrical signal in the time or frequency domain is provided as an input to one or more crossbar arrays configured to implement a spectrum analyzer and noise suppressing circuit.

16. A semiconductor device, comprising:
   one or more sensor input devices to generate an input electrical signal representative of an analog signal;
   at least one input node to receive the input electrical signal representative of an analog input signal; and
   an analog signal processor, comprising one or more crossbar arrays configured to implement one or more circuits to process the input electrical signal representative of an analog input signal to generate processed analog signal data; and
   a sample-and-hold (S/H) circuit to sample and hold a plurality of input signal values at varying points in time based on a configurable sampling rate, wherein the plurality of input signal values is provided as inputs to one or more crossbar arrays configured to implement at least one of a finite impulse response (FIR) filter, a discrete Fourier transform (DFT) filter, or a discrete wavelet transform (DWT) filter to generate an electrical signal in the time or frequency domain representative of the plurality of input signal values.

17. The semiconductor device of claim 16, further comprising at least one analog-to-digital converter communicatively coupled to the analog signal processor.

* * * * *